United States Patent
Iwata (10) Patent No.: US 10,036,927 B2
(45) Date of Patent: Jul. 31, 2018

(54) AUTOMATIC ANTI-GLARE DEVICE FOR VEHICLES

(71) Applicant: HONDA MOTOR CO., LTD., Tokyo (JP)

(72) Inventor: Takahiro Iwata, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/245,797

(22) Filed: Aug. 24, 2016

(65) Prior Publication Data
US 2017/0059896 A1    Mar. 2, 2017

(30) Foreign Application Priority Data

Aug. 25, 2015    (JP) ................................ 2015-165728

(51) Int. Cl.
| | |
|---|---|
| *G02F 1/133* | (2006.01) |
| *G02B 27/00* | (2006.01) |
| *G02F 1/137* | (2006.01) |
| *B60J 3/04* | (2006.01) |

(52) U.S. Cl.
CPC ................ *G02F 1/137* (2013.01); *B60J 3/04* (2013.01); *G02F 1/13318* (2013.01); *G02B 27/0093* (2013.01); *G02F 2001/13312* (2013.01); *G02F 2203/01* (2013.01)

(58) Field of Classification Search
CPC ............................... G02B 27/0093; B60J 3/04
See application file for complete search history.

(56) References Cited

U.S. PATENT DOCUMENTS

| | | | |
|---|---|---|---|
| 2007/0126255 A1* | 6/2007 | Mitsui ........................ | B60J 3/04 296/97.2 |
| 2008/0068359 A1* | 3/2008 | Yoshida ............... | G09G 3/3406 345/204 |
| 2010/0079590 A1* | 4/2010 | Kuehnle ............ | G06K 9/00798 348/118 |
| 2013/0320193 A1* | 12/2013 | Liken .................... | H01L 27/146 250/208.1 |
| 2014/0039730 A1* | 2/2014 | Loubiere ................. | B60R 99/00 701/3 |

FOREIGN PATENT DOCUMENTS

JP    2009-29245 A    2/2009

* cited by examiner

*Primary Examiner* — Nathanael R Briggs
*Assistant Examiner* — Alexander Gross
(74) *Attorney, Agent, or Firm* — Westerman, Hattori, Daniels & Adrian, LLP (57) ABSTRACT

An automatic anti-glare device for vehicles includes: a transmissive liquid crystal panel disposed between a windshield of a vehicle and the head of an occupant; a sun detector that detects a position of the sun; an eyepoint detector that detects a position of the eyes of the occupant; and a controller that forms a light-shielding region in the transmissive liquid crystal panel based on a result of the detection of the sun detector and a result of the detection of the eyepoint detector. When the position of the sun on the transmissive liquid crystal panel moves in a range that does not depart from a stationary region virtually provided on the transmissive liquid crystal panel, the controller maintains the position of the light-shielding region.

8 Claims, 6 Drawing Sheets

AUTOMATIC ANTI-GLARE DEVICE FOR VEHICLES

CROSS REFERENCES TO RELATED APPLICATIONS

The present application claims priority under 35 U.S.C. §119 to Japanese Patent Application No. 2015-165728, filed Aug. 25, 2015, entitled "Automatic Anti-Glare Device For Vehicles." The contents of this application are incorporated herein by reference in their entirety.

BACKGROUND

1. Field

The present disclosure relates to an automatic anti-glare device for vehicles.

2. Description of the Related Art

In general, a vehicle is provided with a sun visor to protect the eyes of an occupant from sunlight and to ensure the vision of the occupant. However, a typical sun visor blocks a wide range in the vision of the driver. To cope with this, for instance, Japanese Unexamined Patent Application Publication (JP-A) No. 2009-29245 proposes an anti-glare device in which a liquid crystal panel is disposed between an occupant and the windshield and a light-shielding pattern is formed only in part the liquid crystal panel. Such an anti-glare device disclosed in JP-A No. 2009-29245 changes the shape and position of the light-shielding pattern according the position of the sun.

However, in a vehicle which is running, the position of the sun with respect to the vehicle changes all the times. For instance, when a vehicle is turning, the position of the sun with respect to the vehicle significantly changes in the right or left direction. In addition, due to vibration of the vehicle while running, the position of the sun with respect to the vehicle finely moves up and down repeatedly all the times. With the anti-glare device disclosed in JP-A No. 2009-29245, the position of the light-shielding pattern changes all the times according to such movement of the vehicle. In such a situation, the light-shielding pattern frequently moves in the vision of an occupant, which gives an annoying impression to the occupant.

SUMMARY

The present disclosure has been made in consideration of the above-described problem, and provides an automatic anti-glare device for vehicles that forms a light-shielding region in part of a liquid crystal panel and avoids frequent change of the light-shielding region.

The present disclosure adopts the following configuration as a solution to solve the aforementioned problem.

A first aspect of the disclosure provides an automatic anti-glare device for vehicles, including: a transmissive liquid crystal panel (for instance, the transmissive liquid crystal panel 2a in the embodiment described below) disposed between a windshield (for instance, the windshield W in the embodiment) of a vehicle and the head of an occupant (for instance, the driver D in the embodiment); a sun detector (for instance, the external camera 3 in the embodiment) that detects a position of the sun; an eyepoint detector (for instance, the camera 5 for occupant in the embodiment) that detects a position of the eyes of the occupant; and a controller (for instance, the control device 7 in the embodiment) that forms a light-shielding region (for instance, the light-shielding region R in the embodiment) in the transmissive liquid crystal panel based on a result of the detection of the sun detector and a result of the detection of the eyepoint detector. When the position of the sun on the transmissive liquid crystal panel moves in a range that does not depart from a first region (for instance, the stationary region R1 in the embodiment) virtually provided on the transmissive liquid crystal panel, the controller maintains a position of the light-shielding region.

According to the present disclosure, when the first region having a certain range is virtually defined on the transmissive liquid crystal panel and the position of the sun on the transmissive liquid crystal panel does not depart from the first region, the position of the light-shielding region formed in the transmissive liquid crystal panel is maintained. Thus, when a change in the position of the sun with respect to the vehicle is small and the position of the sun on the transmissive liquid crystal panel does not depart from the first region, the position of the light-shielding region is not changed. Thus, according to the present disclosure, it is possible to avoid frequent change in the position of the light-shielding region due to a small motion in the direction of turn of the vehicle and/or vertical movement caused by running vibration of the vehicle. Therefore, according to the present disclosure, the automatic anti-glare device for vehicles is provided that forms the light-shielding region in part of the transmissive liquid crystal panel and that is capable of avoiding frequent change of the light-shielding region.

A second aspect of the disclosure adopts a configuration in which in the first aspect of the disclosure, when the position of the sun on the transmissive liquid crystal panel departs from a second region (for instance, the position change region R2 in the embodiment) which is virtually provided on the transmissive liquid crystal panel and which surrounds the first region, the controller maintains the position of the light-shielding region.

According to the present disclosure, the second region, which surrounds the first region, is virtually defined on the transmissive liquid crystal panel. During normal driving of a vehicle, movement of the sun with respect to the vehicle is continuous, and when the sun departs from the first region, the light-shielding region is moved. Thus, the position of the sun on the transmissive liquid crystal panel in normal time is in the inner side of the first region or on the periphery of the first region all the times. On the other hand, for instance, in the case where erroneous detection of the sun detector occurs due to some cause such as reflection of the sunlight by a building or the like, and the controller falsely recognizes the position of the sun on the transmissive liquid crystal panel, the position of the sun on the transmissive liquid crystal panel recognized by the controller may depart from the first region and may suddenly change by a large amount. Even in such a case, according to the present disclosure, when the position of the sun departs from the second region, the position of the light-shielding region is maintained. Thus, according to the present disclosure, it is possible to avoid a sudden change in the position of the light-shielding region by a large amount due to noise as a result of detection, and thus giving uncomfortable feeling to the occupant is avoidable.

A third aspect of the disclosure adopts a configuration in which in the first or second aspect of the disclosure, the width (for instance, the width L1 in the embodiment) of the light-shielding region is a dimension obtained by adding a margin of distance (for instance, the margin of distance α in the embodiment) to a distance from a corner of one of the eyes of the occupant to a corner of the other eye, and the height (for instance, the height L2 in the embodiment) of the light-shielding region is a dimension obtained by adding the margin of distance to a distance from the eyebrows to the lower eyelids of the occupant.

According to the present disclosure, the width of the light-shielding region is the dimension which exceeds the distance from the corner of one of the eyes of the occupant to the corner of the other eye. Therefore, even when the occupant is close to the transmissive liquid crystal panel, it is possible to reliably avoid entry of the sun into the vision of the occupant. Furthermore, since the width dimension of the light-shielding region is the dimension obtained by adding the margin of distance to the distance from the corner of one of the eyes of the occupant to the corner of the other eye, even when the position of the head of the occupant slightly changes, it is possible to avoid entry of the sun into the vision of the occupant.

A fourth aspect of the disclosure adopts a configuration in which in the third aspect of the disclosure, the width and height of the first region are set to be the same dimension as the margin of distance.

According to the present disclosure, the width and height of the first region are set to the same dimension as the margin of distance which is used when the width dimension of the light-shielding region is determined. Therefore, it is possible to reliably make the first region smaller than the light-shielding region. Consequently, it is possible to avoid deviation of the sun to the outside of the light-shielding region more reliably.

A fifth aspect of the disclosure adopts a configuration in which in any one of the first to fourth aspects of the disclosure, when the sun is detected in a state where the sun is not being detected by the sun detector, the controller forms the light-shielding region in the transmissive liquid crystal panel, and when the sun is not detected in a state where the sun is being detected by the sun detector, the controller deletes the light-shielding region in the transmissive liquid crystal panel after elapse of a certain time.

According to the present disclosure, when the sun is detected in a state where the sun is not being detected, the light-shielding region is formed instantaneously. Thus, a situation in which sunlight does not enter the vision of the occupant may be created in a short time. On the other hand, according to the present disclosure, when the sun is not detected in a state where the sun is being detected, the light-shielding region is deleted after elapse of a certain time. Thus, when sunlight is detected again immediately after sunlight is no longer detected, the light-shielding region continues to be formed. Therefore, according to the present disclosure, when a vehicle is running with sunlight filtering through trees, it is possible to avoid giving uncomfortable feeling to the occupant due to frequent repeat of appearing and disappearing of the light-shielding region.

A sixth aspect of the disclosure adopts a configuration in which in any one of the first to fifth aspects of the disclosure, the controller, when changing the position of the light-shielding region, newly forms the light-shielding region centered on an average value of the current position of the sun on the transmissive liquid crystal panel and the position of the sun on the transmissive liquid crystal panel in past.

According to the present disclosure, when an already formed light-shielding region is deleted and a new light-shielding region is formed, in other words, when the light-shielding region is moved, a new light-shielding region is formed centered on the average value of the current position of the sun on the transmissive liquid crystal panel and the past position of the sun on the transmissive liquid crystal panel. Thus, in contrast to the case where the center of a new light-shielding region is defined based on the current position of the sun on the transmissive liquid crystal panel only, the amount of movement of the light-shielding region per unit time is reduced, and thus the light-shielding region may be moved smoothly. Thus, according to the present disclosure, it is possible to avoid giving uncomfortable feeling to the occupant due to high speed movement of the light-shielding region.

A seventh aspect of the disclosure adopts a configuration in which in any one of the first to sixth aspects of the disclosure, the eyepoint detector is an occupant image capture device (for instance, the camera 5 for occupant in the embodiment) that captures the head of the occupant, and when the position of the eyes of the occupant on an image captured by the occupant image capture device does not depart from a third region (for instance, the stationary region R3 in the embodiment) virtually provided on the captured image or when the position of the eyes of the occupant on an image captured by the occupant image capture device departs from a fourth region (for instance, the position change region R4 in the embodiment) which is virtually provided on the captured image and which surrounds the third region, the controller maintains the position of the light-shielding region.

According to the present disclosure, when the third region having a certain range is virtually defined on an image captured by the occupant image capture device and the position of the eyes of the occupant on the captured image does not depart from the third region, the position of the light-shielding region formed in the transmissive liquid crystal panel is maintained. Thus, when the position of the eyes of the occupant does not change, the position of the light-shielding region is not changed.

Furthermore, according to the present disclosure, the fourth region, which surrounds the third region, is virtually defined on an image captured by the occupant image capture device. During normal driving of a vehicle, change in the position of the eyes of the occupant is continuous, and when the sun departs from the third region, the light-shielding region is moved. Thus, the position of the eyes of the occupant on the captured image in normal time is in the inner side of the third region or on the periphery of the third region all the times. On the other hand, for instance, in the case where the controller falsely recognizes the position of the eyes of the occupant on the captured image due to some cause, the position of the eyes of the occupant on the captured image recognized by the controller may depart from the third region and may suddenly change by a large amount. Even in such a case, according to the present disclosure, when the position of the eyes of the occupant departs from the fourth region, the position of the light-shielding region is maintained. Thus, according to the present disclosure, it is possible to avoid a sudden change in the position of the light-shielding region by a large amount due to noise as a result of detection, and thus giving uncomfortable feeling to the occupant is avoidable.

An eighth aspect of the disclosure adopts a configuration in which in the seventh aspect of the disclosure, a width of the third region is set to the same dimension as the distance from the corner of one of the eyes of the occupant on the captured image to the corner of the other eye.

According to the present disclosure, the width (for instance, the width LA in the embodiment) of the third region on the captured image is set to the same dimension as the distance from the corner of one of the eyes of the occupant to the corner of the other eye on the captured image, and thus for a change in the position of the eyes of the occupant, the light-shielding region is moved more quickly than the position of the sun. Thus, it is possible to avoid entry of the sun into the vision of the occupant more reliably.

According to the present disclosure, the automatic anti-glare device for vehicles is provided that forms the light-shielding region in part of the transmissive liquid crystal panel and that is capable of avoiding frequent change of the light-shielding region.

BRIEF DESCRIPTION OF THE DRAWINGS

FIGS. 7A and 7B are each a schematic illustration indicating that the position of the position change region deviates according to a yaw rate, FIG. 7A illustrates the stationary region and the position change region when a vehicle makes a right turn, and FIG. 7B illustrates the stationary region and the position change region when a vehicle makes a left turn.

DESCRIPTION OF THE PREFERRED EMBODIMENTS

Hereinafter, an embodiment of an automatic anti-glare device for vehicles according to the present disclosure will be described with reference to the drawings. It is to be noted that in the following drawings, the scale of each member is appropriately changed in order to achieve recognizable size of the member.

Figure 1:
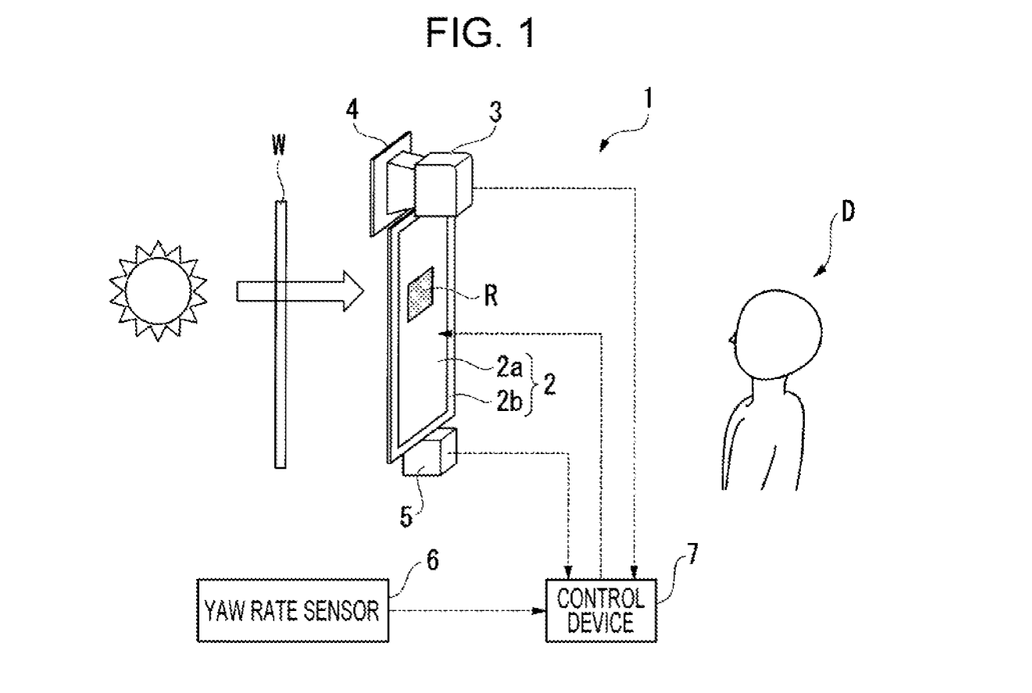
FIG. 1 is a schematic illustration depicting a schematic configuration of an automatic anti-glare device for vehicles in an embodiment of the present disclosure.
Figure 2:
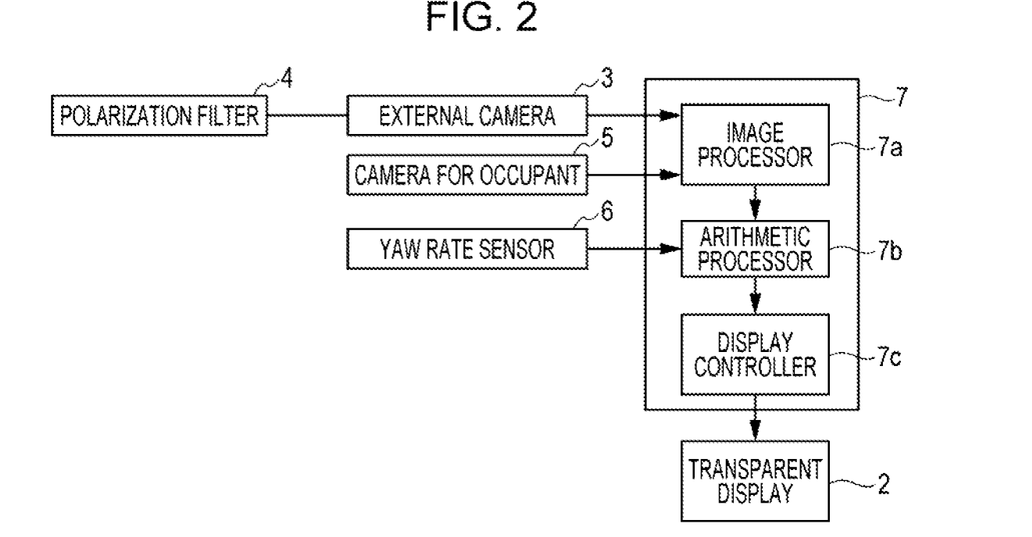
FIG. 2 is a block diagram illustrating a schematic configuration of the automatic anti-glare device for vehicles in the embodiment of the present disclosure.

FIG. 1 is a schematic illustration depicting a schematic configuration of an automatic anti-glare device 1 for vehicles in the present embodiment. Also, FIG. 2 is a block diagram illustrating a schematic configuration of the automatic anti-glare device 1 for vehicles in the present embodiment. As illustrated in these figures, the automatic anti-glare device 1 for vehicles in the present embodiment includes a transparent display 2, an external camera 3 (sun detector), a polarization filter 4, a camera 5 (eyepoint detector, occupant image capture device) for occupant, a yaw rate sensor 6, and a control device 7 (controller).

The transparent display 2 is disposed between a driver D (occupant) and a windshield W, and includes a transmissive liquid crystal panel 2a and a drive circuit 2b. The transmissive liquid crystal panel 2a is a liquid crystal panel that allows light to pass through when not being energized and blocks light when being energized. In other words, the transmissive liquid crystal panel 2a includes transparent pixel electrodes arranged in an array, and a region corresponding to an energized pixel electrode is displayed in black to block light from passing through. The drive circuit 2b is electrically connected to the control device 7, and energizes some pixel electrodes based on a command from the control device 7.

The external camera 3 is disposed in the vehicle cabin so that its lens faces outwardly of the vehicle (forward direction of the vehicle in the present embodiment). The external camera 3 detects the position of the sun by capturing a region ahead of the vehicle. The polarization filter 4 is disposed in front of the lens of the external camera 3. The polarization filter 4 blocks light that comes to the external camera 3 and that is other than the direct light from the sun. The camera 5 for occupant is disposed so that its lens faces the driver D, and for instance, is fixed to the frame of the transparent display 2. The camera 5 for occupant captures the driver D, and detects the position of the eyes of the driver D. As the camera 5 for occupant, an image capture device having a compound eye lens or an image capture device equipped with an infrared sensor is used that is capable of determining the position in depth, for instance. The yaw rate sensor 6 is a sensor that detects a yaw rate of the vehicle, and is disposed, for instance, in the center of the vehicle.

The control device 7 is electrically connected to the transparent display 2, the external camera 3, the camera 5 for occupant, and the yaw rate sensor 6. The control device 7 controls the transparent display 2 based on input signals from the external world camera 3, the camera 5 for occupant, and the yaw rate sensor 6. The control device 7 of the present embodiment includes an image processor 7a, an arithmetic processor 7b, and a display controller 7c as illustrated in FIG. 2. Such a control device 7 includes a dedicated microcontroller, for instance.

The image processor 7a determines the position of the driver D (distance (hereinafter referred to as the driver distance) from the transparent display 2 to the eyes of the driver D, and the vehicle widthwise position (hereinafter referred to as the driver vehicle widthwise position) of the eyes of the driver D with respect to the transparent display 2 based on a captured image inputted from the camera 5 for occupant. It is to be noted that for the sake of calculation, the image processor 7a defines the position of the eyes of the driver D, for instance, as the midpoint between the center of the right eye and the center of the left eye of the driver D. Then the image processor 7a determines the driver distance based on images captured by a compound eye lens, for instance, or determines the driver distance based on input from an infrared sensor. In addition, the image processor 7a determines the distance from the corner of one of the eyes of the driver D to the corner of the other eye based on the captured image inputted from the camera 5 for occupant. At this point, the image processor 7a calculates the actual distance (hereinafter referred to as the distance between the eye corners) from the corner of one of the eyes of the driver D to the corner of the other eye by correcting the distance on an image from the corner of one of the eyes of the driver D to the corner of the other eye based on the driver distance.

In addition, the image processor 7a calculates the actual distance (hereinafter referred to as the distance between the eyebrows and lower eyelids) from the eyebrows to the lower eyelids of the driver D by correcting the distance on an image from the eyebrows to the lower eyelids of the driver D based on the driver distance. Also, the image processor 7a determines (the direction (hereinafter, referred to as the sun angle) of the sun as viewed from the driver D) the position of the sun based on the captured image inputted from the external camera 3. At this point, the image processor 7a assumes, for instance, the position of the sun to be infinity, and further determines the position of the sun based on the driver vehicle widthwise position with respect to the transparent display 2.

The arithmetic processor 7b determines the range of a light-shielding region R (see FIG. 1) formed on the transparent display 2, based on the sun angle, the driver distance, the driver vehicle widthwise position, and the distance between the eye corners of the driver inputted from the image processor 7a. The light-shielding region R is a region indicated in black displayed on the transmissive liquid crystal panel 2a of the transparent display 2, and the region does not allow light from the outside the vehicle to pass through.

Figure 3:
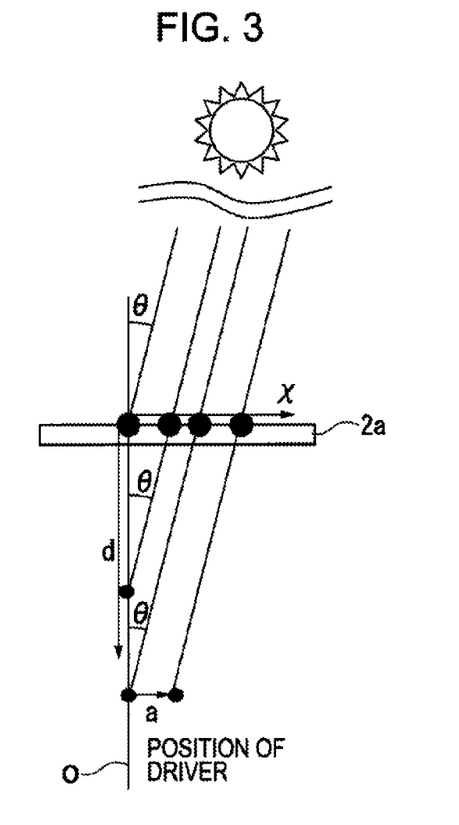
FIG. 3 is a schematic illustration for explaining the center position of a light-shielding region.

FIG. 3 is a schematic illustration for explaining the center position χ of the light-shielding region R. As illustrated in FIG. 3, the center of the transparent display 2 in a vehicle width direction is the reference position O, and when the driver vehicle widthwise position is the reference position O, the center position χ of the light-shielding region R is determined by the following Expression (1). It is to be noted that θ is the sun angle that is the angle formed by a normal line to the transparent display 2, connecting the driver D and the transparent display 2 and the line segment connecting the driver D and the sun. Also, d is the driver distance.

$$\chi = d \tan \theta \tag{1}$$

Thus, when the driver vehicle widthwise position inputted from the image processor 7a is the reference position O, the arithmetic processor 7b determines the center position χ of the light-shielding region R based on the sun angle, the driver distance inputted from image processor 7a and Expression (1).

On the other hand, as illustrated in FIG. 3, when the driver vehicle widthwise position is displaced from the reference position O by a distance a, the center position χ is determined by the following Expression (2).

$$\chi = d \tan \theta + a \tag{2}$$

Thus, the arithmetic processor 7b determines the distance a based on the driver vehicle widthwise position inputted from the image processor 7a, and determines the center position χ of the light-shielding region R based on the distance a, the sun angle, the driver distance, and Expression (2).

Figure 4:
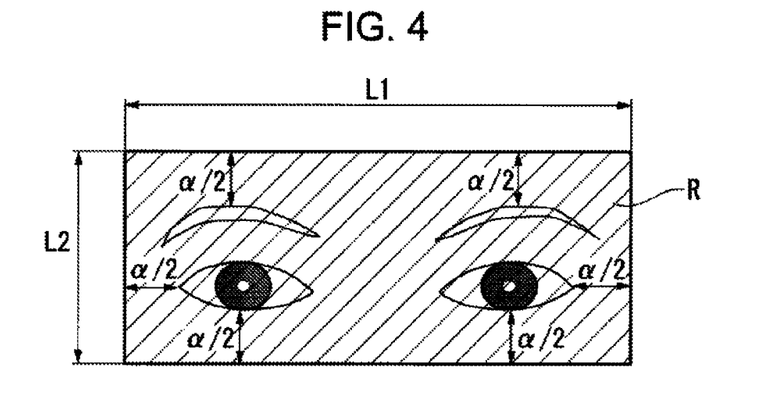
FIG. 4 is a schematic illustration for explaining the size of the light-shielding region.

In addition, in the present embodiment, the arithmetic processor 7b determines the size of the light-shielding region R. FIG. 4 is a schematic illustration for explaining the size of the light-shielding region R. In the present embodiment, the light-shielding region R is a rectangular region as illustrated in FIG. 4. The arithmetic processor 7b determines the width L1 and height L2 of the rectangular light-shielding region R. The arithmetic processor 7b stores a predetermined margin of distance α and determines that the width L1 of the light-shielding region R is the dimension obtained by adding the margin of distance α to the distance between the eye corners inputted from the image processor 7a. In addition, the arithmetic processor 7b determines that the height L2 of the light-shielding region R is the dimension obtained by adding the margin of distance α to the distance between the eyebrows and lower eyelids inputted from the image processor 7a. Consequently, as illustrated in FIG. 4, the light-shielding region R has the width L1 projecting to the right and left from the right and left eye corners of the driver by [α/2] and the height L2 projecting upward and downward from the eyebrows and lower eyelids of the driver by [α/2].

The display controller 7c generates a control signal to be inputted to the transparent display 2, based on the center position χ of the light-shielding region R and the width L1 and height L2 of the light-shielding region R determined by the arithmetic processor 7b as described above, and controls the transparent display 2 based on the control signal, thereby forming the light-shielding region R in the transparent display 2.

Figure 5:
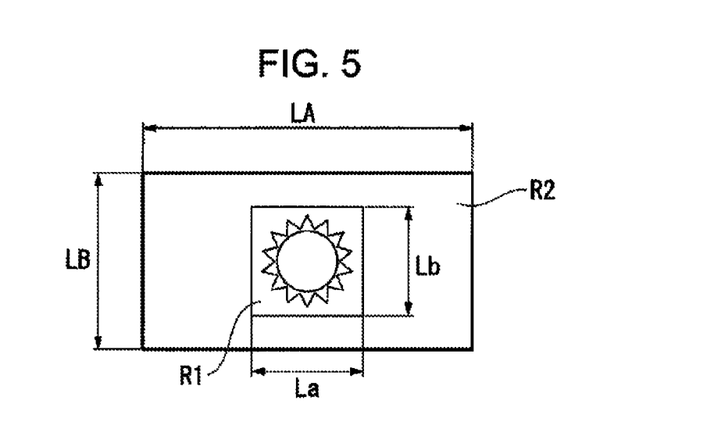
FIG. 5 is a schematic illustration for explaining a stationary region and a position change region on a liquid crystal panel.

In addition, in the present embodiment, the arithmetic processor 7b determines a region on the transmissive liquid crystal panel 2a for determining whether or not the position of the light-shielding region R is changed. Here, the arithmetic processor 7b determines a stationary region R1 (a first region) which is a region where the position of the light-shielding region R is not changed as long as the position of the sun on the transmissive liquid crystal panel 2a does not depart. In addition, the arithmetic processor 7b determines a position change region R2 (a second region) where the position of the light-shielding region R is changed when the position of the sun on the transmissive liquid crystal panel 2a enters the position change region R2.

FIG. 5 is a schematic illustration for explaining the stationary region R1 and the position change region R2. The stationary region R1 is a rectangular region centered on the position (the center of the sun) of the sun on the transmissive liquid crystal panel 2a, and the width La and height Lb are each set to the margin of distance α described above. For instance, the arithmetic processor 7b derives the line segment which connects the driver D and the sun, based on the driver distance, the driver vehicle widthwise position, and the direction of the sun inputted from the image processor 7a, and determines that the point at which the line segment intersects the transmissive liquid crystal panel 2a is the position (the center of the sun) of the sun on the transmissive liquid crystal panel 2a. Furthermore, the image processor 7a draws a square frame having width La and height Lb of the margin of distance α centered on the position of the sun on the transmissive liquid crystal panel 2a, and virtually defines the inside of the square frame as the stationary region R1. In the present embodiment, when the position of the sun on the transmissive liquid crystal panel 2a moves in a range that does not depart from the stationary region R1, the arithmetic processor 7b does not recalculate the position of the light-shielding region R. In other words, in the present embodiment, when the position of the sun on the transmissive liquid crystal panel 2a moves in a range that does not depart from the stationary region R1, the light-shielding region R is not moved.

Figure 6:
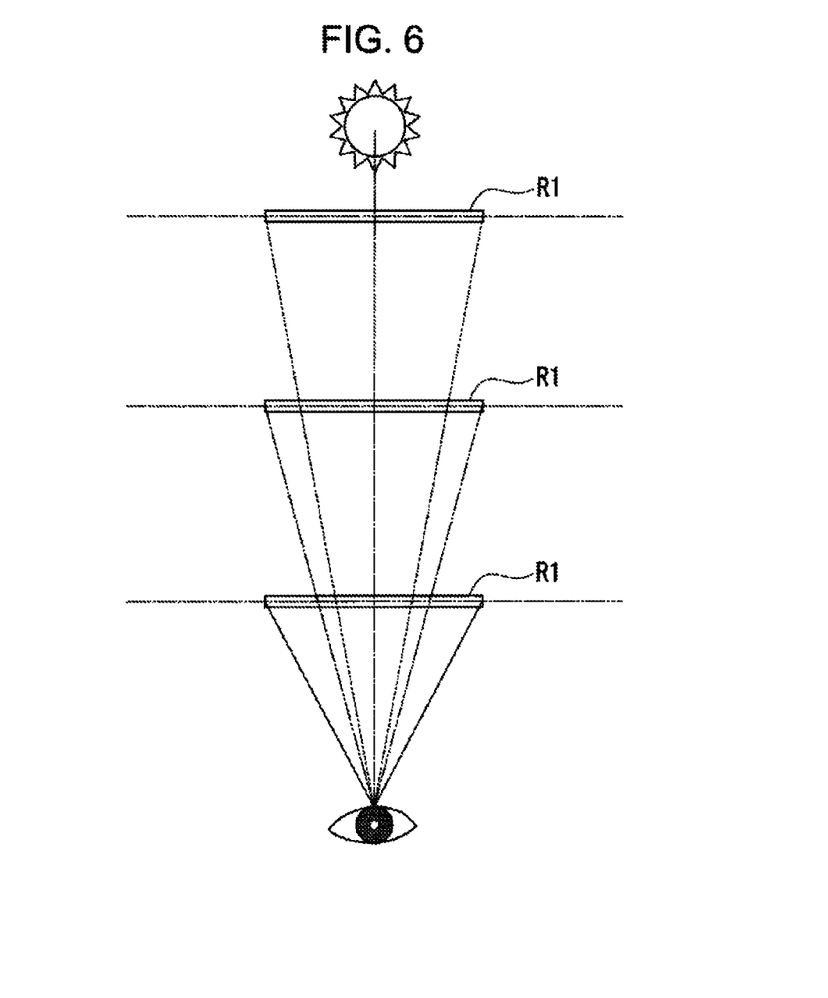
FIG. 6 is a schematic illustration indicating the relationship between a distance to a driver and angle range in which the position of the sun on the transmissive liquid crystal panel departs from a stationary region.

It is to be noted that as described above, the position of the sun on the transmissive liquid crystal panel 2a is determined depending on the driver distance, and thus a range of an angle, for which the position of the sun on the transmissive liquid crystal panel 2a departs from the stationary region R1, varies according to the driver distance. FIG. 6 is a schematic illustration indicating the relationship between the driver distance and the range of an angle for which the position of the sun on the transmissive liquid crystal panel 2a departs from the stationary region R1. As illustrated in this FIG. 6, when the driver distance is short, the range of angle for which the position of the sun departs from the stationary region R1 is wide, and as the driver distance increases, the range of angle for which the position of the sun departs from the stationary region R1 decreases. Thus, the arithmetic processor 7b determines the range of angle for which the position of the sun on the transmissive liquid crystal panel 2a departs from the stationary region R1, based on the driver distance inputted from the image processor 7a, and when the sun angle inputted from the image processor 7a departs from a predetermined sun angle, the arithmetic processor 7b determines that the position of the sun on the transmissive liquid crystal panel 2a departs from the stationary region R1.

Returning to FIG. 5, the position change region R2 is a region that surrounds the stationary region R1 from the front, rear, right and left, and width LA and height LB are predetermined. For instance, the width LA is defined based on the frame rate of the image processor 7a and a maximum yaw rate achievable by a vehicle on which the automatic anti-glare device 1 for vehicles of the present embodiment is mounted. Specifically, the width LA is defined in a range that does not allow the sun positioned in the stationary region R1 to depart from the position change region R2 with the frame rate of the image processor 7a at a maximum yaw rate of the vehicle. In addition, the height LB is defined based on a maximum pitch rate and the frame rate of the image processor 7a. Specifically, the height LB is defined in a range that does not allow the sun positioned in the stationary region R1 to depart from the position change region R2 with the frame rate of the image processor 7a at a maximum pitch rate of the vehicle. In the present embodiment, the arithmetic processor 7b virtually defines such position change region R2, and when the position of the sun on the transmissive liquid crystal panel 2a is positioned in the position change region R2, the arithmetic processor 7b recalculates the position of the light-shielding region R. Consequently, the position of the light-shielding region R is moved. It is to be noted that when the light-shielding region R is moved in this manner, the image processor 7a also redefines the position of the stationary region R1 and the position change region R2.

When the position of the light-shielding region R is moved, the arithmetic processor 7b may form the light-shielding region R based on the center position χ determined by Expression (1) and Expression (2) stated above. However, for instance, the arithmetic processor 7b may form a new light-shielding region R centered on the average value of the current position (newly determined center position χ) of the sun on the transmissive liquid crystal panel 2a and the previous (i.e., the past) position (previous center position X) of the sun on the transmissive liquid crystal panel 2a. When such an average value is used, the amount of movement of the light-shielding region R may be reduced, which may avoid giving an impression of abrupt movement of the light-shielding region R to the driver D.

Also, in the present embodiment, when the position of the sun on the transmissive liquid crystal panel 2a has departed outwardly from the position change region R2, the arithmetic processor 7b determines that the departure is caused by noise and does not recalculate the position of the light-shielding region R. Thus, when the position of the sun on the transmissive liquid crystal panel 2a departs outwardly from the position change region R2, the light-shielding region R is not moved. As described above, since the position change region R2 is defined based on a maximum yaw rate and a maximum pitch rate achievable by the vehicle, the position of the sun on the transmissive liquid crystal panel 2a does not depart outwardly from the position change region R2 during normal running of the vehicle. Therefore, in the case where the position of the sun on the transmissive liquid crystal panel 2a departs outwardly from the position change region R2, it is probable that the position of the sun is erroneously detected due to reflection of the sunlight by a building. Thus, in the present embodiment, when the position of the sun on the transmissive liquid crystal panel 2a departs outwardly from the position change region R2, the light-shielding region R is not moved.

Figure 7A:
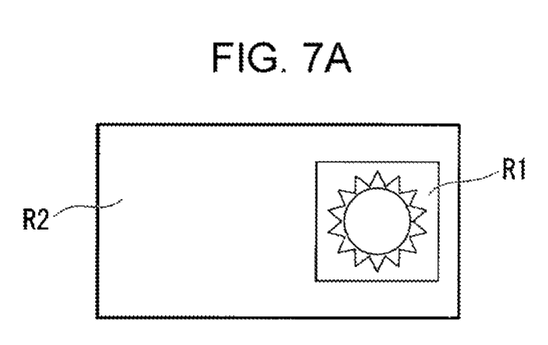
Figure 7B:
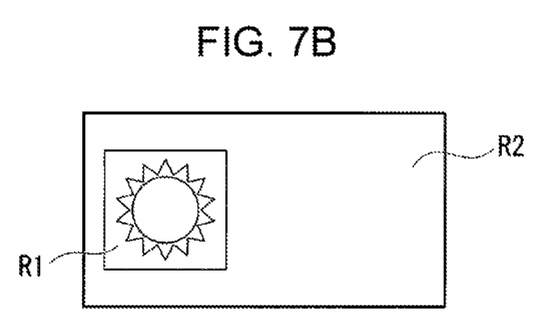

Also, in the present embodiment, the arithmetic processor 7b changes the position of the position change region R2 with respect to the stationary region R1 based on the yaw rate inputted from the yaw rate sensor 6. In general, a vehicle is not able to make a sudden turn, and thus similarly, the direction of movement of the sun on the transmissive liquid crystal panel 2a during the turn does not suddenly change either. Thus, deviation of the position of the position change region R2 with respect to the stationary region R1 in the opposite direction of turn allows the defined range of the position change region R2 to correspond to the actual movement of the sun on the transmissive liquid crystal panel 2a. FIGS. 7A and 7B are each a schematic illustration indicating that the position of the position change region R2 deviates according to a yaw rate, FIG. 7A illustrates the stationary region R1 and the position change region R2 when the vehicle makes a right turn, and FIG. 7B illustrates the stationary region R1 and the position change region R2 when the vehicle makes a left turn. Since the direction of turn of the vehicle and the direction of movement of the sun on the transmissive liquid crystal panel 2a are opposite, when the vehicle makes a right turn, the position change region R2 is caused to deviate to the left side with respect to the stationary region R1 as illustrated in FIG. 7A. In addition, when the vehicle makes a left turn, the position change region R2 is caused to deviate to the right side with respect to the stationary region R1 as illustrated in FIG. 7B.

Figure 8A:
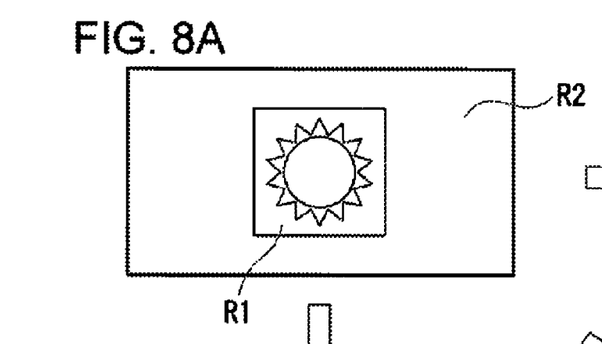
FIGS. 8A to 8D are each a schematic illustration indicating the position of the sun with respect to the stationary region and the position change region.
Figure 8B:
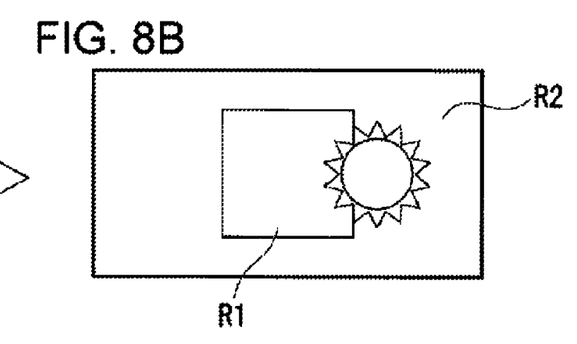
Figure 8C:
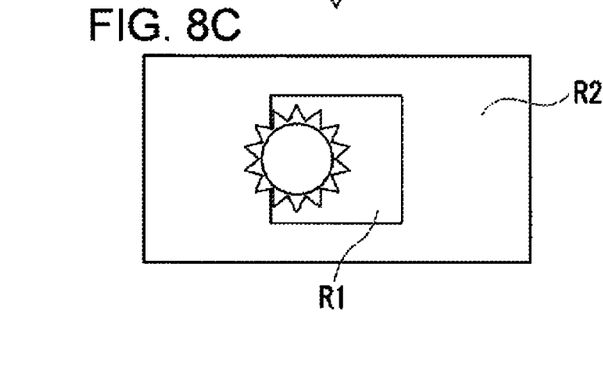
Figure 8D:
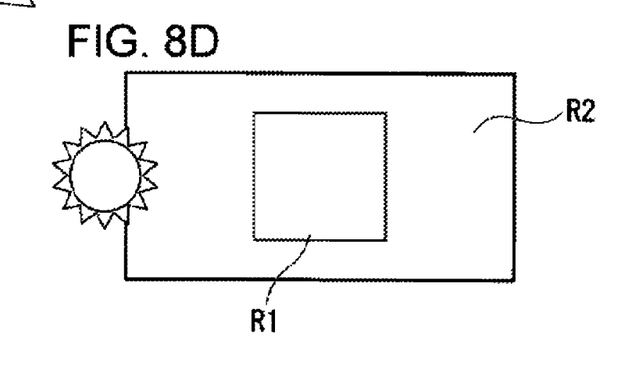

FIGS. 8A to 8D are each a schematic illustration indicating the position of the sun with respect to the stationary region R1 and the position change region R2. When the position of the sun changes from a state where the position is in the range of the stationary region R1 as illustrated in FIG. 8A to a state where the position moves in a range which does not depart from the stationary region R1 as illustrated in FIG. 8B, the light-shielding region R is not moved. Also, when the position of the sun changes from a state where the position of the sun is in the range of the stationary region R1 as illustrated in FIG. 8A to a state where the position has departed from the stationary region R1 and is in the position change region R2 as illustrated in FIG. 8C, the light-shielding region R is moved. Also, when the position of the sun changes from a state where the position is in the range of the stationary region R1 as illustrated in FIG. 8A to a state where the position has departed from the stationary region R1 and the position change region R2 as illustrated in FIG. 8D, the light-shielding region R is not moved.

Figure 9:
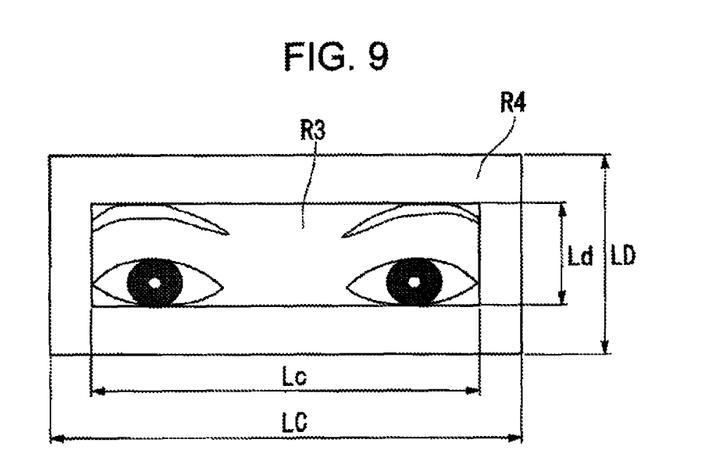
FIG. 9 is a schematic illustration for explaining the stationary region and the position change region on an image.

Furthermore, in the present embodiment, the arithmetic processor 7b determines a region on an image captured by the camera 5 for occupant for determining whether or not the position of the light-shielding region R is changed. Here, the arithmetic processor 7b determines a stationary region R3 (third region) such that as long as the position of the eyes of the driver D on the image does not depart from the stationary region R3, the position of the light-shielding region R is not changed. In addition, the arithmetic processor 7b determines a position change region R4 (fourth region) such that when the position of the eyes of the driver D on the image enters the position change region R4, the position of the light-shielding region R is changed.

FIG. 9 is a schematic illustration for explaining the stationary region R3 and the position change region R4. The stationary region R3 is a rectangular region including the eyes of the driver D on an image. The width Lc of the stationary region R3 is set to the same dimension as the distance from the corner of one of the eyes of the driver D to the corner of the other eye on the image. Also, the height Ld of the stationary region R3 is set to the same dimension as the distance from the eyebrows to the lower eyelids of the driver D on the image. The image processor 7a virtually defines the stationary region R3 on the image, and when the position of the eyes of the driver D does not depart from the stationary region R3, the image processor 7a does not recalculate the position of the light-shielding region R. In other words, in the present embodiment, when the position of the eyes of the driver D does not depart from the stationary region R3 on the image, the light-shielding region R is not moved.

The position change region R4 is a region that surrounds the stationary region R3 from the front, rear, right and left, and width LC and height LD are predetermined. For instance, the width LA is defined based on the frame rate of the image processor 7a and a maximum amount of lateral movement, determined by an experiment or the like, achievable by the driver D during an operation of driving. Specifically, the width LC is defined in a range that does not allow the eyes of the driver D positioned in the stationary region R3 to depart from the position change region R4 with the frame rate of the image processor 7a at a maximum amount of lateral movement achievable by the driver D. Also, the height LD is defined based on the frame rate of the image processor 7a and a maximum amount of vertical movement, determined by an experiment or the like, achievable by the driver D during an operation of driving. Specifically, the height LD is defined in a range that does not allow the eyes of the driver D positioned in the stationary region R3 to depart from the position change region R4 with the frame rate of the image processor 7a at a maximum amount of vertical movement achievable by the driver D. In the present embodiment, the arithmetic processor 7b virtually defines such position change region R4 and when the position of the eyes of the driver D on the image is positioned in the position change region R4, the arithmetic processor 7b recalculates the position of the light-shielding region R. Consequently, the position of the light-shielding region R is moved. It is to be noted that when the light-shielding region R is moved in this manner, the image processor 7a also redefines the position of the stationary region R3 and the position change region R4.

Also, in the present embodiment, when the position of the eyes of the driver D on the image has departed outwardly from the position change region R4, the arithmetic processor 7b determines that the departure is caused by noise and does not recalculate the position of the light-shielding region R. Thus, when the position of the eyes of the driver D on the image has departed outwardly from the position change region R4, the light-shielding region R is not moved.

Next, the operation of the arithmetic processor 7b will be specifically described with reference to FIG. 10 and FIG. 11. In the following description, it is assumed that the light-shielding region R has been already formed on the transmissive liquid crystal panel 2a, and definition of the stationary region R1 and the position change region R2 on the transmissive liquid crystal panel 2a and the stationary region R3 and the position change region R4 on an image has been completed.

Figure 10:
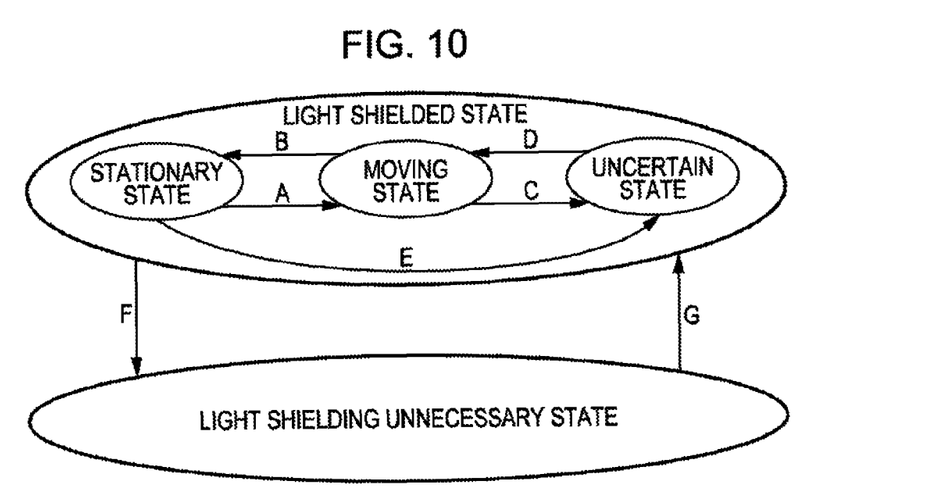
FIG. 10 is a state transition diagram based on the position of the sun on the transmissive liquid crystal panel.

FIG. 10 is a state transition diagram based on the position of the sun on the transmissive liquid crystal panel 2a. When the position of the sun on the transmissive liquid crystal panel 2a is included in the stationary region R1, the arithmetic processor 7b determines that the current state is a stationary state and does not recalculate the position of the light-shielding region R. Thus, in the case of a stationary state, the light-shielding region R is not moved. When the position of the sun on the transmissive liquid crystal panel 2a changes from such a stationary state to a state where the position of the sun has departed from the stationary region R1 and is positioned in the position change region R2, the arithmetic processor 7b makes a transition to a moving state as indicated by an arrow A, and recalculates the position of the light-shielding region R. Thus, in the case of a moving state, the light-shielding region R is moved.

Also, when the position of the sun on the transmissive liquid crystal panel 2a stays in a certain range for a certain time in a moving state, the arithmetic processor 7b makes a transition to a stationary state again as indicated by an arrow B. Here, for instance, when the position of the sun stays in a range having the same area as the stationary region R1 for a certain time, the arithmetic processor 7b defines the stationary region R1 centered on the range and makes a transition to a stationary state. For instance, a minimum square is drawn in which the position of the sun stays for a certain time, and the square may be defined as a new stationary region R1.

Also, when the position of the sun on the transmissive liquid crystal panel 2a has departed from the position change region R2 for a certain number of times during a certain time in a moving state, or when a certain time has not elapsed from a state where the sun is not detected, the arithmetic processor 7b makes a transition to an uncertain state as indicated by an arrow C. In the case of an uncertain state, the arithmetic processor 7b does not recalculate the position of the light-shielding region R. Thus, in the case of an uncertain state, the light-shielding region R is not moved.

Also, when the position of the sun on the transmissive liquid crystal panel 2a is detected in a range having a combined area of the stationary region R1 and the position change region R2 for a certain time with a certain probability in an uncertain state, the arithmetic processor 7b makes a transition to a moving state again as indicated by an arrow D.

Also, when the position of the sun on the transmissive liquid crystal panel 2a has departed from the position change region R2 for a certain number of times during a certain time in a stationary state, or when a certain time has not elapsed from a state where the sun is not detected, the arithmetic processor 7b makes a transition to an uncertain state as indicated by an arrow E.

On the other hand, when a state where the sun is not detected continues for a certain time in a stationary state, a moving state, or an uncertain state, the arithmetic processor 7b makes a transition to a light shielding unnecessary state as indicated by an arrow F. In short, after elapse of a certain time since the start of a state where the sun is not detected, the arithmetic processor 7b makes a transition to a light shielding unnecessary state. In a light shielding unnecessary state, the arithmetic processor 7b inputs a command not to form the light-shielding region R to the display controller 7c. Consequently, the light-shielding region R is deleted.

Also, when the sun is detected in a light shielding unnecessary state, the arithmetic processor 7b immediately makes a transition to a light shielded state as indicated by an arrow G. Here, the arithmetic processor 7b makes, for instance, a transition from a light shielding unnecessary state to a moving state. Thus, a new light-shielding region R is formed on the transmissive liquid crystal panel 2a.

Figure 11:
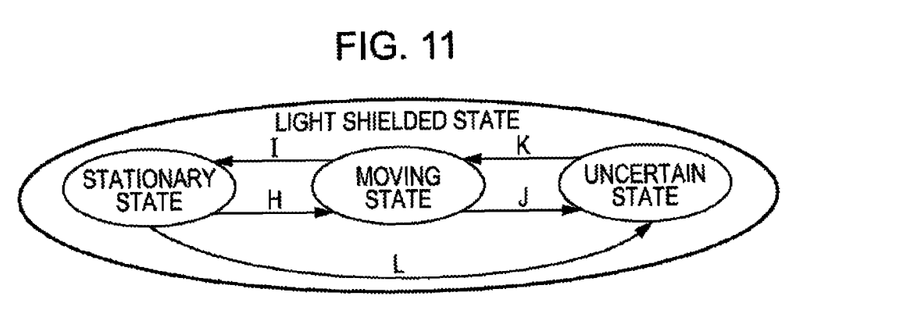
FIG. 11 is a state transition diagram based on the position of the eyes of a driver on an image captured by a camera for occupant.

FIG. 11 is a state transition diagram based on the position of the eyes of the driver D on an image captured by the camera 5 for occupant. When the position of the eyes of the driver D on the image is included in the stationary region R3, the arithmetic processor 7b determines that the current state is a stationary state and does not recalculate the position of the light-shielding region R. Thus, in the case of a stationary state, the light-shielding region R is not moved. When the position of the eyes of the driver D on the image changes from such a stationary state to a state where the position of the sun has departed from the stationary region R3 and is positioned in the position change region R4, the arithmetic processor 7b makes a transition to a moving state as indicated by an arrow H, and recalculates the position of the light-shielding region R. Thus, in the case of a moving state, the light-shielding region R is moved.

Also, when the position of the eyes of the driver D on the image stays in a certain range for a certain time in a moving state, the arithmetic processor 7b makes a transition to a stationary state again as indicated by an arrow I. Here, for instance, when the position of the eyes of the driver D on the image stays in a range having the same area as the stationary region R3 for a certain time, the arithmetic processor 7b defines the stationary region R3 centered on the range and makes a transition to a stationary state.

Also, when the position of the eyes of the driver D on the image has departed from the position change region R4 for a certain number of times during a certain time in a moving state, or when a certain time has elapsed from a state where the eyes of the driver D are not detected, the arithmetic processor 7b makes a transition to an uncertain state as indicated by an arrow J. In the case of an uncertain state, the arithmetic processor 7b does not recalculate the position of the light-shielding region R. Thus, in the case of an uncertain state, the light-shielding region R is not moved.

Also, when the position of the eyes of the driver D on the image is detected in a range having a combined area of the stationary region R3 and the position change region R4 for a certain time with a certain probability in an uncertain state, the arithmetic processor 7b makes a transition to a moving state again as indicated by an arrow K.

Also, when the position of the eyes of the driver D on the image has departed from the position change region R4 for a certain number of times during a certain time in a stationary state, or when a certain time has not elapsed from a state where the eyes of the driver D are not detected, the arithmetic processor 7b makes a transition to an uncertain state as indicated by an arrow L.

In the automatic anti-glare device 1 for vehicles of the present embodiment as described above includes the transmissive liquid crystal panel 2a disposed between the windshield W and the head of the driver D, the external camera 3 that detects the position of the sun, the camera 5 for occupant that detects the position of the eyes of the driver D, and the control device 7 that forms a light-shielding region R on the transmissive liquid crystal panel 2a based on an image (result of the detection) captured by the external camera 3 and an image (result of the detection) captured by the camera 5 for occupant. Furthermore, when the position of the sun on the transmissive liquid crystal panel 2a moves in a range that does not depart from the stationary region R1 virtually provided on the transmissive liquid crystal panel 2a, the control device 7 maintains the position of the light-shielding region R.

Thus, with the automatic anti-glare device 1 for vehicles of the present embodiment, when a change in the position of the sun with respect to the vehicle is small and the position of the sun on the transmissive liquid crystal panel 2a does not depart from the stationary region R1, the position of the light-shielding region R is not changed. Therefore, with the automatic anti-glare device 1 for vehicles of the present embodiment, it is possible to avoid frequent change in the position of the light-shielding region R due to a small motion in the direction of turn of the vehicle and/or vertical movement caused by running vibration of the vehicle. Therefore, the automatic anti-glare device 1 for vehicles of the present embodiment forms the light-shielding region R in part of the transmissive liquid crystal panel 2a and is capable of avoiding frequent change of the light-shielding region R.

Also, in the automatic anti-glare device 1 for vehicles of the present embodiment, when the position of the sun on the transmissive liquid crystal panel 2a departs from the position change region R2 which is virtually provided on the transmissive liquid crystal panel 2a and which surrounds the stationary region R1, the control device 7 maintains the position of the light-shielding region R. During normal driving of a vehicle, movement of the sun with respect to the vehicle is continuous, and when the sun departs from the stationary region R1, the light-shielding region R is moved. Thus, the position of the sun on the transmissive liquid crystal panel 2a in normal time is in the inner side of the stationary region R1 or on the periphery of the stationary region R1 all the times. On the other hand, for instance, in the case where erroneous detection of the external camera 3 occurs due to some cause such as reflection of the sunlight by a building or the like, and the control device 7 falsely recognizes the position of the sun on the transmissive liquid crystal panel 2a, the position of the sun on the transmissive liquid crystal panel 2a recognized by the control device 7 may depart from the stationary region R1 and may suddenly change by a large amount. Even in such a case, with the automatic anti-glare device 1 for vehicles of the present embodiment, when the position of the sun departs from the position change region R2, the position of the light-shielding region R is maintained. Thus, with the automatic anti-glare device 1 for vehicles of the present embodiment, it is possible to avoid a sudden change in the position of the light-shielding region R by a large amount due to noise as a result of detection, and thus giving uncomfortable feeling to the occupant is avoidable.

Also, in the automatic anti-glare device 1 for vehicles of the present embodiment, the width L1 of the light-shielding region R is the dimension obtained by adding the margin of distance α to the distance from the corner of one of the eyes of the driver D to the corner of the other eye, and the height L2 of the light-shielding region R is the dimension obtained by adding the margin of distance α to the distance between the eyebrows and lower eyelids of the driver D. Therefore, even when the driver D is close to the transmissive liquid crystal panel 2a, it is possible to reliably avoid entry of the sun into the vision of the occupant. Furthermore, since the width dimension of the light-shielding region R is the dimension obtained by adding the margin of distance to the distance from the corner of one of the eyes of the occupant to the corner of the other eye, even when the position of the head of the driver D slightly changes, it is possible to avoid entry of the sun into the vision of the driver D.

In the automatic anti-glare device 1 for vehicles of the present embodiment, the width La and height Lb of the stationary region R1 are set to the same dimension as the margin of distance α. Therefore, it is possible to reliably make the stationary region R1 smaller than the light-shielding region R. Consequently, it is possible to avoid deviation of the sun to the outside of the light-shielding region R more reliably.

In the automatic anti-glare device 1 for vehicles of the present embodiment, when the sun is detected in a state where the sun is not being detected by the external camera 3, the control device 7 forms the light-shielding region R in the transmissive liquid crystal panel 2a, and when the sun is not detected in a state where the sun is being detected by the external camera 3, the control device 7 deletes the light-shielding region in the transmissive liquid crystal panel after elapse of a predetermined time. With the automatic anti-glare device 1 for vehicles of the present embodiment like this, when the sun is detected in a state where the sun is not being detected, the light-shielding region R is formed instantaneously. Thus, a situation in which sunlight does not enter the vision of the driver D may be created in a short time. On the other hand, when the sun is not detected in a state where the sun is being detected, the light-shielding region R is deleted after elapse of a certain time. Thus, when sunlight is detected again immediately after sunlight is no longer detected, the light-shielding region R continues to be formed. Therefore, with the automatic anti-glare device 1 for vehicles of the present embodiment, when a vehicle is running with sunlight filtering through the trees, it is possible to avoid giving uncomfortable feeling to the driver D due to frequent repeat of appearing and disappearing of the light-shielding region R.

Also, in the automatic anti-glare device 1 for vehicles of the present embodiment, when the position of the eyes of the driver D on an image does not depart from the stationary region R3 virtually provided on the image and when the position of the eyes of the driver D on the image departs from the position change region R4 which is virtually provided on the image and which surrounds the stationary region R3, the control device 7 maintains the position of the light-shielding region R. With the automatic anti-glare device 1 for vehicles of the present embodiment like this, it is possible to avoid a sudden change in the position of the light-shielding region R by a large amount due to noise as a result of detection, and thus giving uncomfortable feeling to the occupant is avoidable.

Also, in the automatic anti-glare device 1 for vehicles of the present embodiment, the width Lc of the stationary region R3 is set to the same dimension as the distance from the corner of one of the eyes of the driver D to the corner of the other eye on an image. Therefore, for a change in the position of the eyes of the driver D, the light-shielding region R is moved more quickly than a change in the position of the sun. Thus, it is possible to avoid entry of the sun into the vision of the driver D more reliably.

Although a preferred embodiment of the present disclosure has been described with reference to the drawings in the above, the present disclosure is not limited to the above-described embodiment. The geometries and a combination of constituent members presented in the above-described embodiment provide only an example, and various modifications may be made based on a design request in a range not departing from the spirit of the present disclosure.

For instance, in the above embodiment, the example has been described in which the transparent display 2 is disposed between the driver D and the windshield W. However, the present disclosure is not limited to this, and it is also possible to install the transparent display 2 between an occupant on the front passenger seat and the windshield W or between an occupant and a side window.

Also, in the above embodiment, the example has been described in which each of the sun detector and the eyepoint detector is a camera. However, the present disclosure is not limited to this, and other detection devices may be used as the sun detector and the eyepoint detector of the present disclosure.

Also, in the above embodiment, the example has been described in which the light-shielding region R is a region displayed in black that does not allow light to pass through at all. However, the present disclosure is not limited to this, and the light-shielding region R may have a colored region that allows part of light to pass through.

What is claimed is:

1. An automatic anti-glare device for a vehicle, comprising:
    a sun detector that is installed in the vehicle and detects a position of the sun;
    an eyepoint detector that is installed in the vehicle and detects a position of eyes of an occupant in the vehicle; and
    a transmissive liquid crystal panel disposed between a windshield of the vehicle and a head of the occupant such that the occupant has an outside view through the transmissive liquid crystal panel and the windshield, the transmissive liquid crystal panel being configured to generate a light-shielding region therein for shielding the eyes from the sun;
    a controller that causes the light-shielding region to appear on the transmissive liquid crystal panel based on the position of the sun detected by the sun detector and the position of the eyes detected by the eyepoint detector,
    wherein the controller is configured,
        to determine a position of the sun on the transmissive liquid crystal panel in a view from the occupant, generate a first virtual region which is smaller than the light-shielding region on the transmissive liquid crystal panel in such location that the position of the sun is within the first virtual region, and detect whether the position of the sun stays within the generated first virtual region on the transmissive liquid crystal panel, and
        to maintain a position of the light-shielding region on the transmissive liquid crystal panel when it is detected that the position of the sun moves, but stays within the first virtual region.

2. The automatic anti-glare device according to claim 1, wherein the controller is further configured to detect whether the position of the sun on the transmissive liquid crystal panel is within a second virtual region which surrounds the first virtual region and to maintain the position of the light-shielding region when it is detected that the position of the sun on the transmissive liquid crystal panel departs from the first virtual region to an outside of the second virtual region.

3. The automatic anti-glare device according to claim 1, wherein a width of the light-shielding region is set to a dimension in length which is a total of a distance between corners of the eyes and an additional distance from each corner of the eyes as a margin, and
a height of the light-shielding region is set to a dimension which is a total of a distance from an eyebrow to a lower eyelid of each eye of the occupant and said additional distance from each of the eyebrow and the lower eyelid.

4. The automatic anti-glare device according to claim 3, wherein each of the width and height of the first virtual region is set to be the same dimension as the additional distance.

5. The automatic anti-glare device according to claim 1, wherein the controller is configured to detect a change in a result of the sun detection from a first state where the sun is not being detected to a second state where the sun is being detected by the sun detector, and vice versa, the controller being configured,
to cause the light-shielding region to appear on the transmissive liquid crystal panel when it is detected that the first state where the sun is not being detected is changed to the second state where the sun is being detected, and
to cause the light-shielding region to disappear from the transmissive liquid crystal panel after elapse of a predetermined time when it is detected that the second state where the sun is being detected is changed to the first state where the sun is not being detected.

6. The automatic anti-glare device according to claim 1, wherein the controller is configured to determine an averaged region obtained from current and past light-shielding regions and to change the position of the light-shielding region in such a manner that a newly-generated light-shielding region appears at the averaged region.

7. The automatic anti-glare device according to claim 1, wherein
the eyepoint detector is an occupant image capture device that captures the head of the occupant and generates an image including the eyes of the occupant, and
the controller is configured to detect whether the position of the eyes of the occupant in the image is within a third virtual region and to detect whether the position of the eyes in the image is within a fourth virtual region which surrounds the third region,
the controller maintains the position of the light-shielding region in each of cases where it is detected that the position of the eyes is within a third virtual region and it is detected that the position of the eyes departs from the third virtual region to an outside of the fourth virtual region.

8. The automatic anti-glare device according to claim 7, wherein a width of the third region is set to a dimension which is a distance between corners of the eyes of the occupant.

* * * * *